US012169418B2

(12) United States Patent
Melanson et al.

(10) Patent No.: US 12,169,418 B2
(45) Date of Patent: Dec. 17, 2024

(54) VOLTAGE REGULATORS

(71) Applicant: Cirrus Logic International Semiconductor Ltd., Edinburgh (GB)

(72) Inventors: John L. Melanson, Austin, TX (US); John P. Lesso, Edinburgh (GB)

(73) Assignee: Cirrus Logic Inc., Austin, TX (US)

( * ) Notice: Subject to any disclaimer, the term of this patent is extended or adjusted under 35 U.S.C. 154(b) by 0 days.

(21) Appl. No.: 18/323,530

(22) Filed: May 25, 2023

(65) Prior Publication Data

US 2023/0376063 A1 Nov. 23, 2023

Related U.S. Application Data

(63) Continuation of application No. 17/092,569, filed on Nov. 9, 2020, now Pat. No. 11,687,107.

(51) Int. Cl.
*G05F 1/575* (2006.01)

(52) U.S. Cl.
CPC .................................... *G05F 1/575* (2013.01)

(58) Field of Classification Search
CPC . G05F 1/575; G05F 1/59; G05F 1/595; G05F 1/5735; G05F 1/573; G05F 1/567; G05F 1/565; G05F 1/56
See application file for complete search history.

(56) References Cited

U.S. PATENT DOCUMENTS 5,744,944 A 4/1998 Danstrom
8,154,263 B1 4/2012 Shi et al.
2007/0080670 A1 4/2007 Galinski, III
2010/0148742 A1 6/2010 Nakashima
2013/0119954 A1* 5/2013 Lo .......................... G05F 1/575 323/280
2015/0286232 A1 10/2015 Parikh
2016/0173066 A1 6/2016 Yang et al.
2019/0041885 A1 2/2019 Hu et al.
2019/0258283 A1 8/2019 Pishdad

OTHER PUBLICATIONS

International Search Report and Written Opinion of the International Searching Authority, International Application No. PCT/GB2021/052724, mailed Feb. 7, 2022.

* cited by examiner

*Primary Examiner* — Nguyen Tran
(74) *Attorney, Agent, or Firm* — Jackson Walker L.L.P.

(57) ABSTRACT

This application relates to voltage regulators and, particular, to low-dropout regulators (LDOs). The regulator (300) has an output stage (102) which receives an input voltage (Vin) and outputs an output voltage (Vout) and which includes at least one transistor (103) as an output device configured to pass an output current to the output, based on a drive voltage (V1). A differential amplifier (101) is configured to receive a feedback signal derived from the output voltage and also a reference voltage (REF) to generate an amplifier output to control the drive voltage (V1) to minimise any difference between the feedback signal and the reference voltage. A controller (301) is operable to selectively reconfigure the output stage to provide a change in output current in response to a load activity signal (ACT), which is indicative of a change in load activity that results in a change in load current demand for a load connected, in use, to the output.

19 Claims, 7 Drawing Sheets

VOLTAGE REGULATORS

The present application is a continuation of U.S. Non-provisional patent application Ser. No. 17/092,569, filed Nov. 9, 2020, which is incorporated by reference herein in its entirety.

FIELD OF DISCLOSURE

The field of representative embodiments of this disclosure relates to methods, apparatus and/or implementations concerning or relating to voltage regulators, and in particular to low-dropout regulators and methods of operation thereof.

BACKGROUND

There are a number of application where voltage regulators may be required, e.g. as part of a power supply for some circuitry, and, in many applications, low-dropout regulators (LDOs) may be used. LDOs may be implemented with a relatively small circuit area.

FIG. 1 illustrates one example of a generalised LDO 100 for receiving an input voltage Vin and outputting a regulated output voltage Vout. The LDO 100 comprises a differential amplifier 101 which drives an output stage 102 based on the difference between a feedback signal Sfb, derived from the output voltage Vout, and a reference voltage REF, which may, for example, be a bandgap reference. The output stage 102 comprises an output device 103, which typically comprises at least one FET, for passing an output current. FIG. 1 shows an example where there is a single transistor 103 as the output device, in this example an NMOS, but it will be understood that other arrangements are possible.

In operation, the output of amplifier 101 controls a drive voltage V1 at a control node of the output stage 102, in this example the gate terminal of transistor 103, and there may be some capacitance 104 coupled to this node. The capacitance 104 maintains loop stability, and may, for example, be coupled to ground, or may be coupled as loop feedback. The amplifier 101 drives the output stage 102 so as to minimise any difference between the feedback signal Sfb and the voltage reference REF, and thus regulate the output voltage Vout to a desired level. FIG. 1 illustrates that the feedback signal Sfb is tapped directly from the output, but it will be understood that the feedback signal could be tapped via a voltage divider or other level shifter to provide a desired scaling between the reference voltage and the regulated output voltage.

An output capacitor 105 is coupled to the LDO output to maintain the output voltage Vout. In at least some applications, an LDO may be used for applications where there may be a significant variation in load demand in use. Conventionally, for such applications, the capacitance of the output capacitor 105 of an LDO may be relatively large to cope with a varying load demand.

The LDO will typically be implemented as an integrated circuit on a semiconductor die, i.e. on a chip. Providing large value output capacitors as part of such an integrated circuit may require a large circuit area, which may not be practical. Conventionally, therefore, the output capacitor 105 may be implemented as a separate, i.e. off-chip, component. The use of separate, i.e. non-integrated or off-chip capacitors, requires connections for external components and thus adds the pin count for the integrated circuit die, which can add to the size and cost of the circuitry, particularly if a given chip includes multiple LDOs.

SUMMARY

Embodiments of the present disclosure relate to methods, apparatus and systems for voltage regulation, in particular to LDOs, that mitigate at least these issues.

According to an aspect of the disclosure there is provided a voltage regulator comprising:

- an output stage comprising an input node for receiving an input voltage; an output node for outputting an output voltage; and an output device comprising at least one transistor configured to pass an output current to the output node based on a drive voltage at a control node;
- a differential amplifier configured to receive a feedback signal derived from the output voltage at a first input and to receive a reference voltage at a second input and to generate an amplifier output to control the drive voltage of the output stage to minimise any difference between the feedback signal and the reference voltage; and
- a controller operable to selectively reconfigure the output stage to provide a change in output current in response to a load activity signal indicative of a change in load activity that results in a change in load current demand for a load connected, in use, to the output node.

In some implementations, the controller is operable to reconfigure the output stage to provide a variation in the drive voltage so as to provide at least some of the change in output current.

In some implementations, the voltage regulator comprises a digital-to-analogue converter (DAC) coupled to the control node such that a variation in the DAC output results in a variation in the drive voltage and wherein the controller is configured to control the output of the DAC.

In some examples, the output stage may comprise a loop capacitor with a first terminal coupled to the control node and the DAC is coupled to a second terminal of the loop capacitor.

In some examples, the DAC may comprise a plurality of DAC capacitors each having a first terminal coupled to the control node and wherein a second terminal of each of the DAC capacitors is selectively connectable to one of at least two defined voltages.

In some examples, the output stage may comprise a voltage bias source and a loop capacitor with a first terminal coupled to an output of the differential amplifier. The voltage regulator may be configured such that the first terminal of the loop capacitor can be selectively connected to the control node via a first path that bypasses the voltage bias source or a second path which includes the voltage bias source in series. The controller may be configured to control connection via the first path or the second path.

In some examples, the output stage may comprise a loop capacitor with a first terminal coupled to the control node and one or more current sources for sourcing or sinking current from the control node. The controller may be configured to control the one or more current sources to selectively charge or discharge the loop capacitor to provide said variation in the drive voltage.

The controller may be operable to selectively control the variation in the drive voltage applied in response to a change in load activity based on at least one indication of operating conditions. The operating conditions may comprise at least one of temperature and input voltage.

The controller may be operable to control the variation in the drive voltage for a type of change in load activity based on one or more stored control settings predetermined for that type of change in load activity. In some examples, the controller may further comprise a monitor for monitoring the output voltage in response to a change in load activity to determine an extent of any variation in output voltage. The controller may be configured to, over the course of a plurality of changes in load activity, adapt the one or more stored control settings so as to minimise the extent of any variation in output voltage. The controller may comprise a processing module for implementing a learning algorithm to adapt the one or more stored control settings.

In some implementations the controller is, additionally or alternatively, operable to reconfigure an effective size of the output device so as to provide at least some of said change in output current. The output device may comprise a first transistor and at least one additional transistor which can be selectively coupled in parallel with the first transistor to vary the size of the output device. A gate terminal of the additional transistor may be coupled to a gate terminal of the first transistor, a source terminal of the additional transistor may be coupled to both a source terminal of the first transistor and the output node, and a drain terminal of the additional transistor may be configured to be selectively coupled to both a drain terminal of the first transistor and the input node.

In some implementations, the controller may be operable to reconfigure the output stage to provide a variation in a bulk bias voltage applied to a bulk terminal of the at least one transistor of the output device so as to provide at least some of said change in output current.

The voltage regulator may be operable to selectively regulate the output voltage to one of a plurality of different voltage magnitudes. The controller may be configured, in response to a change in output voltage magnitude, to control the output stage to provide a change in output current from the output device for a transition period so as to charge or discharge an output capacitor coupled to the output node. The voltage regulator may be configured to selectively vary the output voltage magnitude to provide dynamic voltage scaling for the load connected, in use, to the output node.

The voltage regulator may comprise an output capacitor coupled to the output node, and the output capacitor may be integrated with the voltage regulator in a semiconductor die.

In another aspect, there is provided a voltage regulator for outputting a regulated output voltage comprising:

- an amplifier configured to receive a feedback signal indicative of the output voltage and reference voltage and to generate an amplifier output to control an output stage as part of a control loop to maintain the regulated output voltage; and
- a controller operable independently of the control loop to selectively control the output stage to provide a variation in output current in response to a load activity signal that indicates a change in load current demand.

In a further aspect there is provided a low-dropout voltage regulator for providing a regulated output voltage comprising:

- an amplifier responsive to a feedback signal indicative of the output voltage to control an output stage to provide an output current that maintains the regulated output voltage; and
- a controller responsive to a feedforward signal indicative of load current demanded to control the output stage to provide a variation in output current in response to a change in load current demand.

It should be noted that, unless expressly indicated to the contrary herein or otherwise clearly incompatible, then any feature described herein may be implemented in combination with any one or more other described features.

BRIEF DESCRIPTION OF THE DRAWINGS

For a better understanding of examples of the present disclosure, and to show more clearly how the examples may be carried into effect, reference will now be made, by way of example only, to the following drawings in which.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

Embodiments of the present disclosure relate to voltage regulators, in particular to LDOs and to operation thereof.

One problem that may arise for LDOs is the response to a relatively large and relatively rapid variation in load. For example, in some implementations the load current may exhibit a step change of up to a factor of 100:1 or more.

Figure 1:
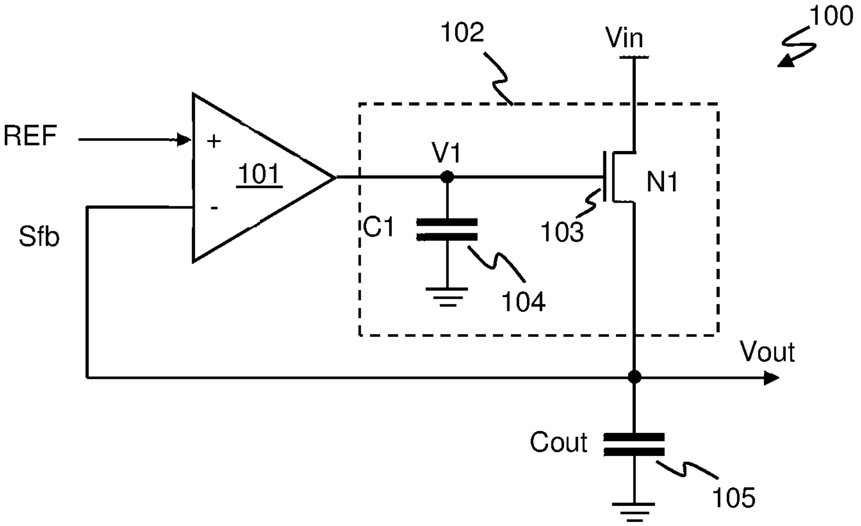
Figure 1 PRIOR ART
FIG. 1 illustrates an example of a conventional LDO.
Figure 2:
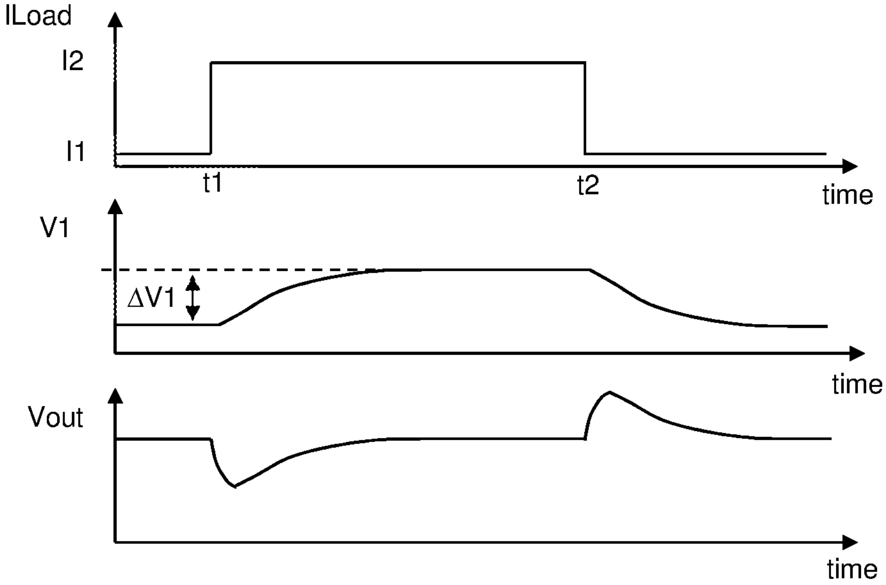
Figure 2 PRIOR ART
FIG. 2 illustrates example waveforms for the response of a conventional LDO to a large change in load current.

As an example, FIG. 2, illustrates some example waveforms for an LDO, such as the LDO 100 illustrated in FIG. 1, in response to a large step change in load current. FIG. 1 illustrates how the load current ILoad, drive voltage V1 and output voltage Vout may vary over time.

FIG. 2 illustrates an example where, initially, the load current is at a substantially steady level I1 and then, at a time t1, there is a significant increase in load current to a higher level I2. The increase in load current will discharge the output capacitor 105 until the loop of the LDO responds to meet the increased current demand. To provide the increased current demand, the amplifier 101 will need to charge the capacitance 104 (which will be referred to herein as a loop capacitor) to increase the drive voltage V1, i.e. gate voltage, so that the transistor 103 passes the increased current. For stability reasons, there may be a limit as to how quickly the loop dynamics respond to transients at the output and, in some applications, such as for use in battery powered devices, it may be desirable to keep the power dissipation as low as possible, which may place limits on the drive capability of the amplifier 101. Thus, for significant changes in load current, it will take some time for the LDO to respond and charge loop capacitor 104 to increase the drive voltage V1 by an appropriate amount. During this time, the significantly increased load current may cause the output voltage Vout to droop by a relatively significant amount.

For instance, purely by way of example, the initial load current I1 could be about 10 μA, which increases to a current I2 of around 1 mA at time t2. Assuming the FET 103 is operating in weak inversion, the required change 4V1 in the drive voltage may be of the order of about 140 mV or so, and, as noted, it may take some time for the amplifier 101 to increase the drive voltage V1 by such an amount. During this time, the output voltage Vout could droop by an amount of the order of 140 mV or so, which can, in many applications, be undesirable.

FIG. 2 also illustrates that on a relatively large and rapid reduction in current demand, illustrated in this example as a drop of the load current from a level I2 back to I1 at a time t2, the gate drive voltage V1 will be driven to a lower value, but again the control loop of the LDO will take some time to respond and this may lead to the output voltage Vout exhibiting a relatively significant overvoltage above the nominal output voltage.

The variation in the output voltage resulting from a variation in load can be somewhat mitigated by use of a large capacitance Cout for the output capacitor 105. However, as noted above, it may not be practical to have a sufficiently large capacitance integrated in the same semiconductor die with the LDO circuit, and using separate, off-chip, capacitors requires additional die connections, which increases pin count and may also be undesirable.

In addition, in some embodiments it may be desirable for the voltage regulator to be able to selectively regulate to different output voltages in use, e.g. to be able to dynamically change, in use, from regulating to a first output voltage magnitude Vout1 to a different output voltage magnitude Vout2, for instance to implement dynamic voltage scaling. In such cases, a large output capacitance may be undesirable in terms of allowing relatively rapid changes in the regulated output voltage.

Embodiments of the present disclosure relate to voltage regulators, in particular LDOs, in which the voltage regulator can be selectively controlled to provide a change in output current independently of the operation of the normal control loop of the voltage regulator.

In other words, the voltage regulator may be controlled so as to implement the change in output current at any time, without needing to wait for the control loop to respond to a change in load current demand. The change in output current may be a relatively significant change in output current and may be implemented rapidly, e.g. as an effective step-change in output current. The change in output current can be controlled based on a known or expected change in load current demand, e.g. timed so that the change in output current occurs at substantially the same time as the change in load current demand.

The load current required for a particular load will generally depend on the activity, or operating status, of the load. For instance, a load may comprise one or more components that may not be in continuous use, i.e. which may be disabled or in an inactive or sleep state for part of the time. The load current required may then depend on whether or not the components are enabled or not. This requirement, may in many cases, be knowable by the circuitry. Purely by way of example, a load may comprise one or more digital processing blocks or modules that may be selectively enabled. The load current for a given processing block may be relatively low when inactive, but, when the processing block is enabled the dynamic power dissipation may be significant. As another example, a radio transmitter may be in standby for at least part of the time but turned on for data transmission, with a consequent increase in current demand.

Analogue circuits may likewise be enabled only when needed. As a further example, the load may comprise one or more LEDs which are driven at a known current when enabled.

In embodiments of the present disclosure, an LDO can thus be controlled, independently of the normal control loop for regulating the output voltage, so that output current can be rapidly varied when required, based on knowledge of a change of load activity. The output current of the LDO can thus be controlled to be at, or relatively near, an output current level that is appropriate for the new load current demand given the change in load activity. This rapid change in output current can thus provide at least some of the required change in output current due to the change in load current demand (i.e. based on the change in load activity). Thus, the requirement for the control loop to respond to satisfy a change in load current demand is reduced or, in some cases, even eliminated, which can reduce the amount to which the output capacitor is discharged or over-charged and thus reduce the extent of any unwanted change in output voltage. Additionally or alternatively, reducing the requirement for the control loop to respond to satisfy a significant change in load current demand may allow the power dissipation of the amplifier 101 to be kept relatively low, thus improving the power demands of the system whilst maintaining stability over a range of operating conditions.

Figure 3:
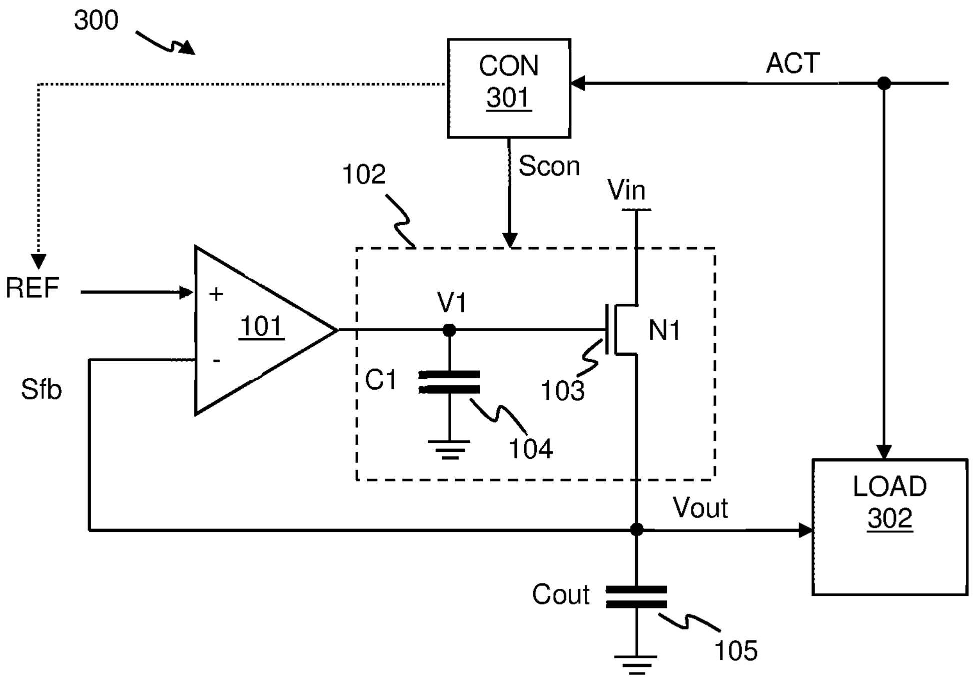
FIG. 3 illustrates an example of an LDO according to an embodiment.

FIG. 3 illustrates generally an example of an embodiment. FIG. 3 illustrates an LDO similar to that illustrated in FIG. 1, and similar components are illustrated by the same reference numerals. Again, it will be understood that FIG. 3 illustrates just one example of an LDO and variants are possible, e.g. with a voltage divider or some other level shifter as part of the feedback path and/or with alternative arrangement of transistors for the output device.

The LDO 300 of FIG. 3 includes a controller 301 for controlling the LDO to selectively provide a rapid change in the output current independently of the control loop of the LDO. The controller 301 is configured to selectively reconfigure the output stage 102 so as to provide the change in the output current, which may be an effective step-change in output current.

There are various ways in which the output stage 102 may be configured to provide such a change in output current, as will be discussed in more detail below. For example, the output stage may be reconfigured to provide a rapid change in the drive voltage V1, independently of the control loop, and/or the operating conditions or configuration or the output transistor(s) 103 may be varied so as to vary the output current for a given drive voltage.

The controller 301 is responsive to a load activity signal ACT which is indicative of activity of the relevant load 302 that is supplied by the output voltage Vout. In at least some applications, at least part of the load 302 may be enabled or disabled by a control signal and the relevant control signal may thus provide the load activity signal ACT. In general, however, any signal which is indicative of a change in activity of the load, which results in a change in load current demand, may be used as a load activity signal.

The load activity signal ACT can thus provide an indication of an activity status or operating mode of the load and can signal to the controller 301 when a significant change in current demand of the load will occur. When the controller 301 determines that a significant change in load current demand will occur, the controller 301 can selectively reconfigure the output stage 102, via a control signal Scon, to provide an appropriate change in output current, which may be an effective step-change in output current.

The load activity signal ACT can thus be seen as a feedforward signal indicative of changes in load current demand and the controller 301 is responsive to this signal. The operation of the controller 301 to reconfigure the output stage of the LDO in response to the load activity signal is independent of the normal control loop of the LDO, i.e. does not depend on the feedback signal Sfb or the output of the amplifier 101. It will be understood, however, that the normal control loop will also continue to operate, and the action of the control loop will be to continue to try to maintain the output voltage Vout at the desired level based on the comparison of the feedback signal Sfb to the reference REF.

The LDO 300 may thus be seen as being operable in different operating states, with the controller 301 being operable to control the operating state of the LDO based on the load activity signal. When operating in any given operating state, the control loop of the LDO may remain active and thus the action of the feedback loop and amplifier 101 will be to control the drive voltage V1 to keep the feedback signal Sfb equal to the reference voltage REF and hence maintain the output voltage at a desired level.

As an example, consider that the load 302 comprises a processing module that may be enabled or disabled as required, and where the processing module significantly increases the load current demand when enabled. Initially, the load may be operating in a first operating mode with the relevant processing module disabled and the controller 301 may control the LDO 300 to be operating in a first state. The processing module may be enabled by a control signal so that the load begins operating in a second operating mode, with an increased current demand. This control signal is received by the controller 301 as the load activity signal ACT, and when the control signal enables the processing module, the controller 301 controls the LDO to operate in a second state, which provides a significant increase in output current so as to meet at least some of the increased current demand.

In the first or second state of operation of the LDO, the control loop of the LDO 300 will continue to operate and thus will respond to any variation in output voltage from the desired output. It will thus be clear that the first and second states of the LDO 300 are each operational states of the LDO in which the LDO is enabled and active to provide an output voltage Vout and thus may provide a non-zero output current. It is noted that, for some conventional LDOs, it may be the case that the LDO could be arranged so as to be disabled or inactive if its relevant load is disabled, and the LDO may thus be controlled to only be activated when the load is activated. It will be understood, however, that embodiments of the present invention include a controller which is operable to reconfigure the LDO to provide a change in output current when the LDO is active. The controller may thus selectively control the LDO to adopt a selected one of at least two different active operating states.

As noted above, the controller 301 may reconfigure the output stage 102 of the LDO 300 to provide a rapid change in output current in a variety of different ways and, in some implementations, may reconfigure the output stage so as to provide a variation in the drive voltage V1, i.e. the gate voltage of transistor 103, so as to provide at least some of the change in output current.

Figure 4:
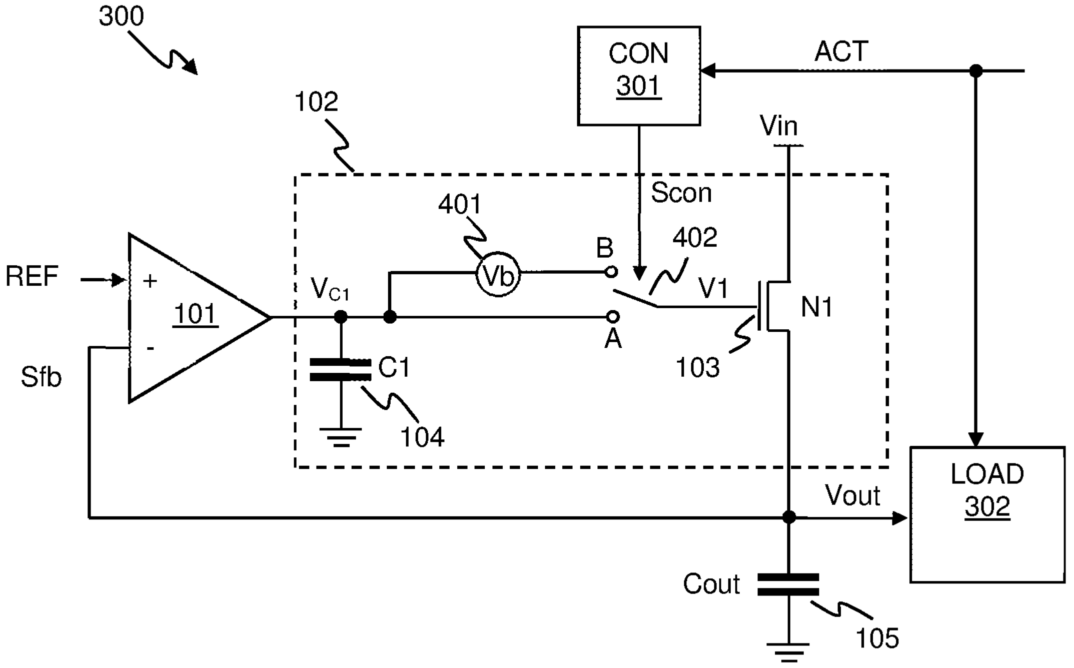
FIG. 4 illustrates an example of an LDO with a bias source that can be selectively connected to vary the drive voltage.

FIG. 4 illustrates one example of how the LDO circuit 300 may be reconfigured so as to provide a rapid change in drive voltage. FIG. 4 illustrates that the output stage comprises a voltage bias source 401 that can be selectively controlled to contribute to the control voltage V1 at the gate of transistor 103. In the example of FIG. 4 a selector switch 402 is controlled by the controller 301 to selectively connect the voltage bias source 401 in series between the loop capacitor 104 and the gate terminal of transistor 103, although it will be understood that other arrangements are possible.

The controller 301 controls the selector switch 402, e.g. via a switch control signal S1, to provide a first state, illustrated as connection A, or a second state, illustrated by connection B. In the first state, the capacitor 104 is connected to the gate terminal of transistor 103 via a first path that bypasses the bias source 401. In this state the drive voltage V1 at the gate of the transistor 103 is substantially equal to the voltage $V_{C1}$ maintained by the capacitor 104. In the second state, the loop capacitor 104 is connected to the gate terminal of transistor 103 via a second path that includes the bias source 401 in series. In this state the drive voltage V1 at the gate of the transistor 103 is substantially equal to the voltage $V_{C1}$ maintained by the loop capacitor 104 combined with the voltage Vb of the voltage bias source 401.

The voltage Vb provided by the voltage bias source 401 may be based on the change in drive voltage required to meet an expected change in load current demand. For example, referring back to the example discussed with reference to FIG. 2, the load current demand may be expected to change from a level l1 to a level l2 based on part of the load being enabled. In that example, with a load current demand l1 around 10 μA and a load current demand l2 around 1 mA, the required voltage change 4V1 of the drive voltage V1 to provide the required change in output current may be of the order of about 140 mV or so. In which case the bias source 401 could be implemented to provide a bias voltage Vb of around 140 mV.

Figure 5:
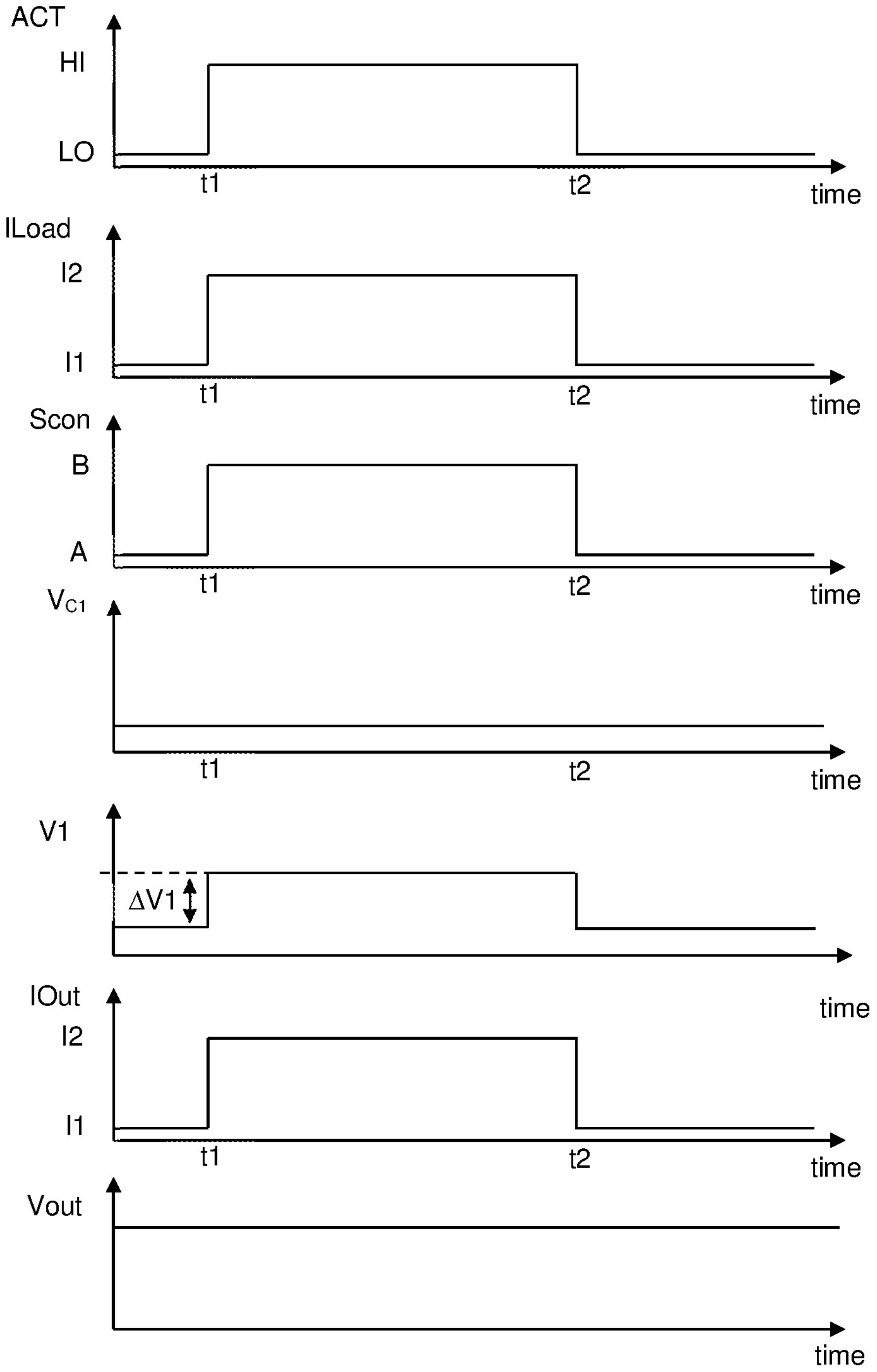
FIG. 5 illustrates example waveforms for the response of the LDO of FIG. 4 to a large change in load current.

FIG. 5 illustrates some example waveforms for the LDO 300 illustrated in FIG. 4, in response to a large step change in load current.

FIG. 5 illustrates an example of the load activity signal ACT which in this case may take a high value HI or a low value LO to enable or disable a module of the load, respectively. In this example the load activity signal is initially at the low value LO and the load current demand ILoad is at a steady first level l1.

The controller 301 receives the load activity signal and controls the selector switch 402 based on the load activity signal. Before the time t1, the controller 301 thus controls switch 401, e.g. via the control signal Scon, to provides connection A. Before t1 the LDO can thus be seen as operating in a first state, in which the loop capacitor 104 is directly connected to the gate terminal of transistor 103 and the drive voltage V1 is equal to the voltage $V_{C1}$ maintained by loop capacitor 104. By virtue of the operation of the control loop of the LDO, the drive voltage V1 is maintained at a level such that output transistor 103 provides an output current Iout that matches the load current demand and maintains the output voltage Vout at the regulated level.

At a time t1, the load activity signal goes high, and enables the relevant module of the load. This results in a significant increase in load current demand to a higher level 12. The load activity signal ACT going high also results in the controller 301 controlling the selector switch 401 to switch to connection B, which switches the LDO to a second state, in which the bias source 401 is connected in series between loop capacitor 104 and the gate terminal of the transistor 103. The voltage $V_{C1}$ maintained by the capacitor 104 remains substantially unchanged, but the additional bias voltage Vb results in a step-change in the drive voltage V1 at the gate terminal of transistor 103. This provides a consequent step-change in output current Iout.

If the bias voltage Vb is correctly matched to the voltage change ΔV1 required for the new current demand, the output current Iout will correctly match the new current demand and the output voltage Vout will be maintained with no substantial variation. In which case there would be substantially no perturbation of the feedback signal. In practice, the bias voltage may not be exactly matched to voltage change required and immediately after the LDO changes state there may be some mismatch between the output current and the current demand. Additionally or alternatively, propagation delays and the like could result in some slight timing mismatch between the change in load current demand and the output current.

Any such mismatch in output current and load current demand may lead to some variation in the output voltage Vout, however, the magnitude and/or duration of any such mismatch in the output current and load current demand may be significantly reduced, compared to the example of FIG. 2, and the operation of the feedback loop may thus be able to maintain the output voltage within acceptable limits of the desired output voltage.

FIG. 5 also illustrates that at a time t2 the load activity signal ACT may go low, to disable the relevant component of the load, with a consequent reduction in load current demand. The controller 301 will then control selector switch 402 back to connection A so that the LDO switches back to the first state. The contribution of the bias voltage Vb will thus be removed and the drive voltage V1 will return the level $V_{C1}$ of capacitor 104, with a consequent reduction in output current.

Figure 6:
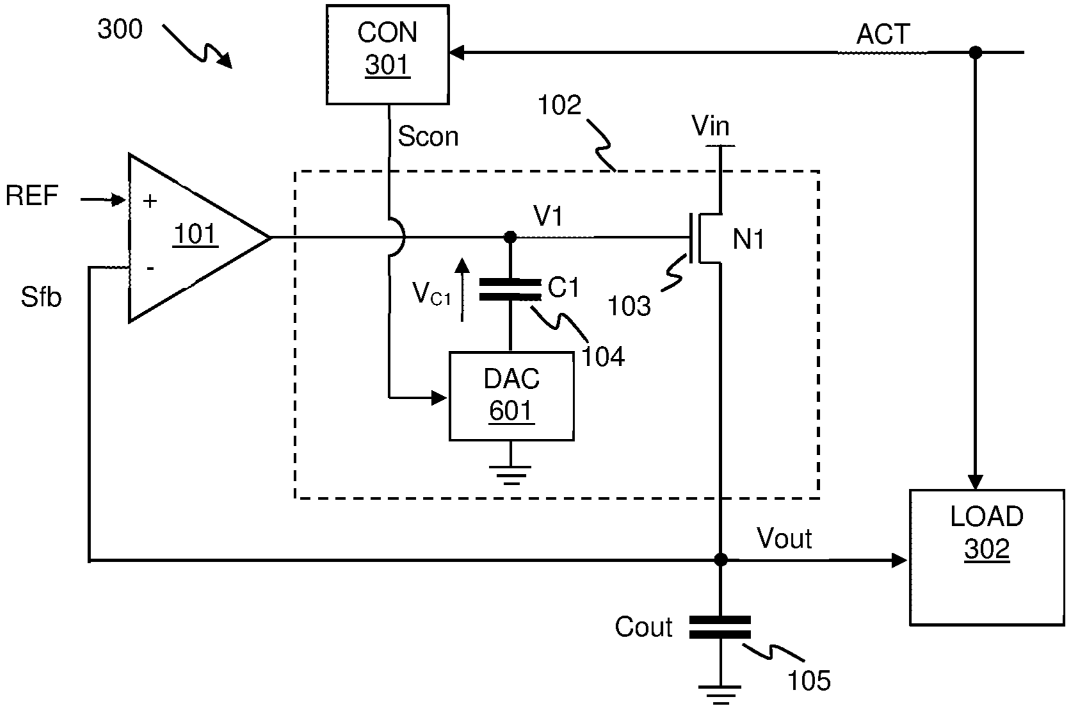
FIG. 6 illustrates an example of an LDO including a voltage DAC that can be selectively connected to vary the drive voltage.

FIG. 6 illustrates another example of how the LDO circuit 300 may be reconfigured so as to provide a rapid change in drive voltage V1. In this example, a first terminal of the loop capacitor 104 is coupled to a control node for the drive voltage V1 and the second terminal of the loop capacitor is coupled to a variable voltage, in this case provided by a voltage DAC (digital-to-analogue converter) 601.

In use, the controller 301 controls the DAC 601 to control the voltage at the second terminal of the loop capacitor 104. The operating state of the output stage 102 of the LDO 300 can be varied by the controller 301 by selectively varying the DAC voltage, e.g. by providing a suitable input to the DAC via the control signal Scon.

In use, with a relatively steady load current demand, the LDO may operate in one state with a given selected DAC output voltage (which in some implementations could be selected to be zero in one state). In steady state operation, the control loop will operate to maintain the drive voltage V1 at a level that provides a suitable output current to maintain the output voltage Vout at the regulated level. The loop capacitor 104 will thus be charged to a capacitor voltage $V_{C1}$. When the controller 301 determines that there is a significant change in load current demand, based on the load activity signal ACT, the controller 301 can control the DAC 601 to vary the DAC output voltage by a desired amount. This change in DAC output voltage at the second terminal of the loop capacitor 104 will cause a corresponding change at the first terminal, and hence will result in a change in the drive voltage V1. The change in the DAC output voltage can be controlled to correspond to the expected change in drive voltage V1 required for the expected load current demand.

For instance, with reference to the example discussed with reference to FIG. 5, but now considering the operation of the embodiment of FIG. 6, when the load activity signal ACT changes at a time t1, the controller 301 of the embodiment of FIG. 6 may control the voltage DAC 601 so that output voltage increases by an amount ΔV1 sufficient to provide the expected load current. For the specific example discussed above, the output of the DAC 601 may thus increase by 140 mV or so at a time t1.

The use of a voltage DAC 601 thus provides a simple means of varying the drive voltage V1, and the variation in drive voltage can be implemented very rapidly or effectively instantaneously. Additionally, the use of DAC 601 allows for the amount of variation in the drive voltage V1 to be selectively controlled, depending on the output range and resolution of the DAC 601. This can be advantageous if the expected load current demand may vary between several different demand levels, e.g. if the load comprises multiple modules that may be independently enabled or disabled, as the DAC 601 output voltage may be set to different levels appropriate to the expected load current demand, e.g. the number of modules enabled or disabled.

Additionally or alternatively, the use of a DAC can allow the amount of variation in drive voltage to be tuned, e.g. to be calibrated to an appropriate voltage variation for a given change in load activity and/or to account for any variations in operating conditions. The use of a DAC can thus allow the change in drive voltage to be tuned to account for PVT (process-voltage-temperature) variations or the like. The relevant DAC control settings required for a given load activity mode or operating conditions may be determined in a learning processes, which may, in some instance, be implemented by machine learning or an appropriate learning algorithm by the controller 301 as will be discussed in more detail below.

FIG. 6 illustrates that the DAC may be coupled to the loop capacitor. In some implementations the loop capacitor 104 could effectively be provided as part of a DAC, as illustrated in FIG. 7.

Figure 7:
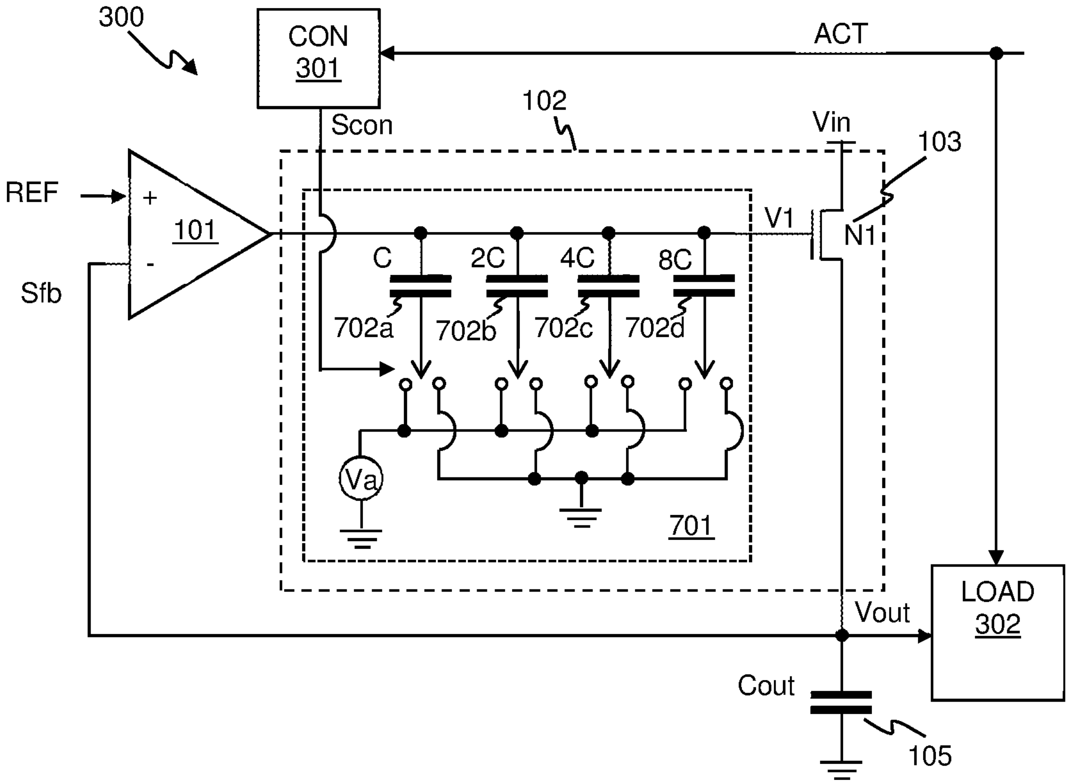
FIG. 7 illustrates an example of an LDO where the loop capacitor is formed as part of a voltage DAC.

FIG. 7 illustrates an example of an LDO where the output stage comprises a DAC 701 which comprises a plurality of DAC capacitors 702*a-d* (which may be referred to individually or collectively by reference 702). The DAC capacitors 702 may have different capacitance values, and in the example of the FIG. 7 there are four DAC capacitors 702 with binary weighted capacitances, although it will be understood that other examples may use a different number of capacitors and/or different weightings. In this example, a first terminal of each DAC capacitor 702 is coupled to the control node for the drive voltage, and a second terminal of each capacitor may be selectively connected to either of at least two defined voltages, which in this case are ground and a non-zero voltage Va. In some cases, the two voltages may be ground and a fixed power supply voltage. The controller 301 selectively controls which of the DAC capacitors are connected to ground and which are connected to the defined voltage Va and can vary the drive voltage V1 by switching the configuration of which capacitors are connected to ground or the bias voltage.

For instance, if the second terminals of all the capacitors 702*a-d* were initially connected to ground, then, in steady state operation, all the capacitors would all be charged to the same voltage (which would be equal to the then-present value of the drive voltage V1). If all the capacitors were then switched, at the same time, to instead connect their second terminal to the defined voltage Va, the voltage across each capacitor would remain the same and the voltage at the first terminal would increase by an amount equal to the defined voltage, which would thus increase the drive voltage V1 by an amount equal to Va. If, however, only some of the capacitors 702 were connected to the defined voltage Va, whilst the rest were maintained connected to ground, this would result in a charge redistribution to equalise the voltage at the first terminal of all the capacitors. The result would be an increase in the drive voltage V1 by a proportion of the defined voltage Va that corresponds to the proportion of the overall capacitance which is switched to connect to the defined voltage Va.

The DAC capacitors 702*a-d* thus form part of the DAC 701 but also provide the functionality of the loop capacitor in maintaining the drive voltage in operation in any given state.

Figure 8:
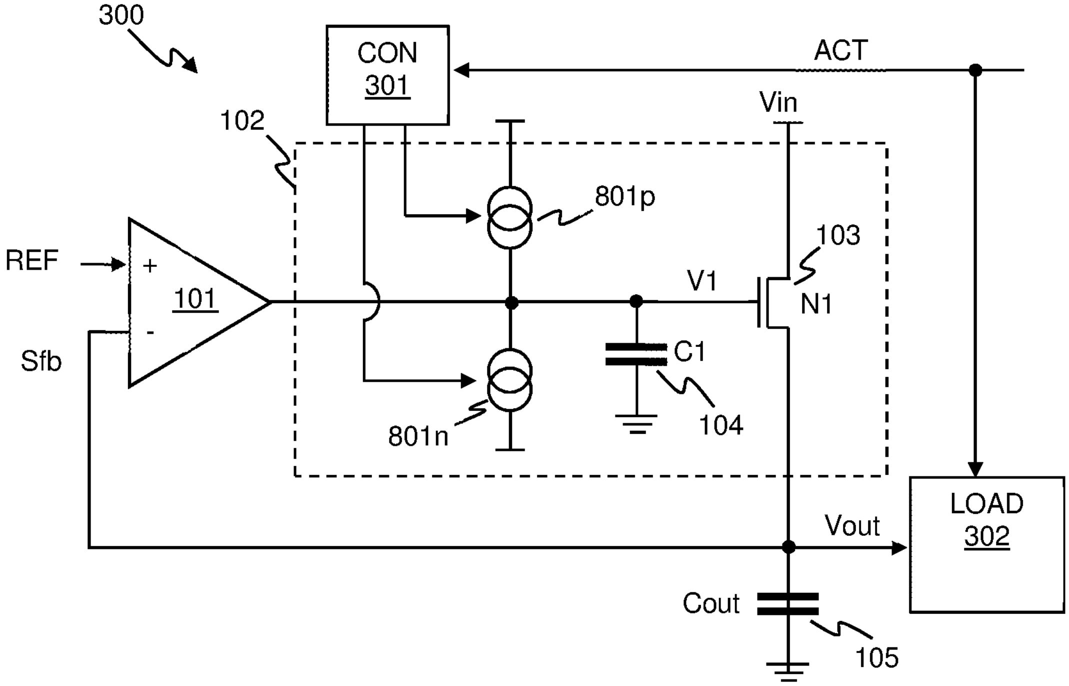
FIG. 8 illustrates an example of an LDO with controlled current sources for controllably varying the drive voltage.

FIG. 8 illustrates a further example of a LDO according to an embodiment in which the controller 301 controls the change in drive voltage V1 by controlling at least one current source 801 to source or sink current from the control node. The current, in effect, injects or removes charge so as to charge or discharge the loop capacitor 104 independently of the control loop so as to vary the drive voltage V1 at the control node.

FIG. 8 thus illustrates that the output stage 102 of the LDO comprises, in this example, two current sources, a first current source 801*p* for charging the loop capacitor 104 and a second current source 801*n* for discharging the loop capacitor 104. If the load activity signal ACT indicates that there will be a significant increase in load current demand, the controller 301 can thus activate the current source 801*p* to supply a defined current and increase the drive voltage V1, whereas if the load activity signal ACT indicates that there will be a significant decrease in load current demand, the controller 301 may activate current source 801*n* to sink a defined current and decrease the drive voltage V1. The change in the control voltage V1 will depend on the value of the defined current and the duration for which the defined current is supplied. In some implementations, the magnitude of the defined current may be fixed and the controller 301 may control the duration for which the defined current is applied, i.e. the period for which the relevant current source is active, to control the extent of the voltage change. However, in some implementations, each current source may be a variable current source and the controller 301 may additionally or alternatively be arranged to control the magnitude of the defined current.

The use of current sources will mean that the drive voltage will ramp up or down over the period of time for which the current is applied. The magnitude of the defined current may be relatively high, so that the time required to change the drive voltage V1 based on a change in load activity is relatively short. In general the period of time over which the current is applied should be short enough to avoid any unwanted glitches or significant disturbance of the output voltage. The magnitude of the defined current may be set, based on the capacitance of the loop capacitor 104 and an expected maximum change in drive voltage in use, to be able to provide the maximum voltage change within a certain maximum duration. It will be understood that in this embodiment, the current sources 801*p* and 801*n* are only activated when required to provide a rapid change in the control voltage V1. Thus, the LDO 300 may operate in a first state with the current source deactivated unless and until the load activity signal ACT indicates a significant change in load current demand. At that point, the controller 301 may switch to a second operating state and activate the relevant current source for an appropriate period to provide the desired change in control voltage. After the appropriate period, the current source will be deactivated and the LDO will return to the first state of operation, but with the drive voltage set to a new operating point.

In the embodiments discussed above the controller 301 can thus operate to reconfigure the output stage of the LDO to provide a rapid change in drive voltage V1. Additionally or alternatively, in some implementations the configuration or operation of the output device, i.e. the output transistor(s), may be varied as to vary the output current for a given drive voltage.

Figure 9:
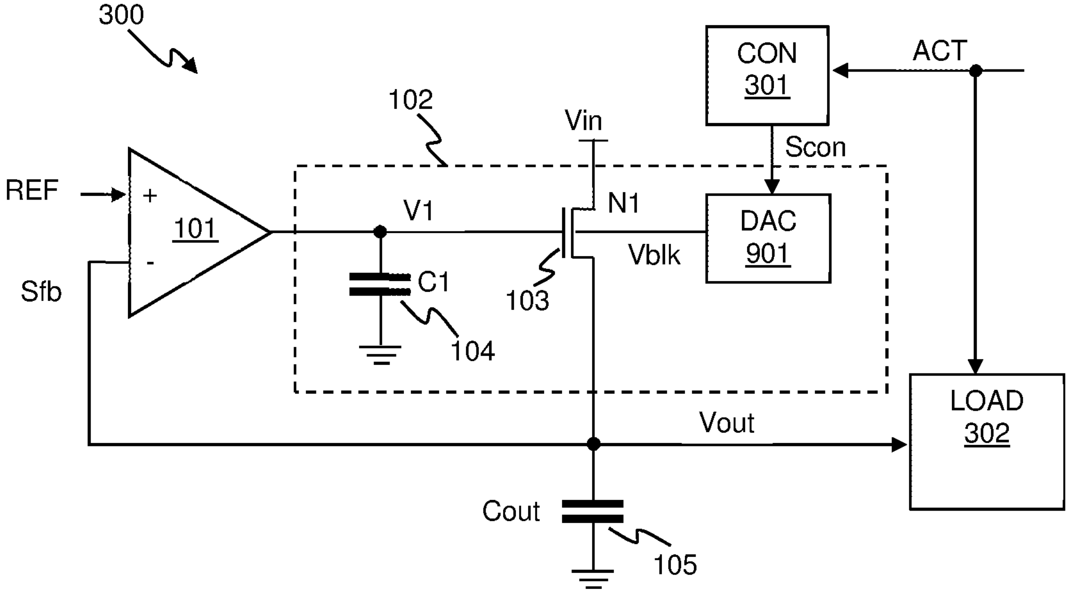
FIG. 9 illustrates another example of an LDO including a voltage DAC for controllably varying a control voltage of the output transistor.

FIG. 9 illustrates an embodiment of an LDO including a variable voltage source, in this case a DAC 901, which is operated by the controller 301 to selectively control a control voltage Vblk in response to the load activity signal. In the embodiment of FIG. 9, the voltage Vblk from DAC 901 is not used to modulate the drive voltage V1, but is applied to vary the operation of the output device, and in this case is applied as a bias voltage to a bulk terminal of the output transistor 103 so as to vary the conduction and hence the output current for a given drive voltage V1.

Figure 10:
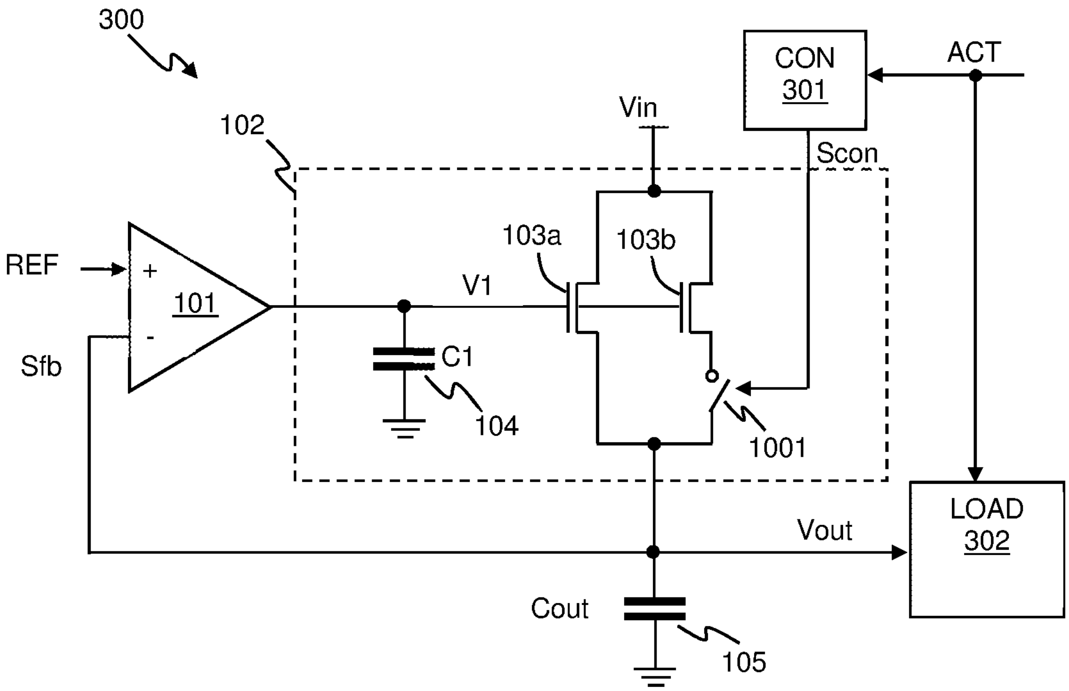
FIG. 10 illustrates an example of an LDO in which the effective width of the output device can be controllably varied.

FIG. 10 illustrates an embodiment in which the output stage is reconfigurable to provide a variable size of output device. As will be understood by the skilled person, the current which is passed by a MOS transistor, i.e. the drain-source current, depends on, and is proportional to, the physical width of the transistor, i.e. the width of the channel region. Varying the effective width of the output transistor(s) can thus vary the output current for a given drive voltage.

In the example of FIG. 10, the output stage 102 comprises first and second transistors 103*a* and 103*b* both coupled to the input voltage and each configured to receive the drive voltage V1 as a gate voltage. The first and second transistors 103*a* and 103*b* thus collectively provide the output device. The second transistor 103*b* may be selectively coupled in parallel with the first transistor 103*a*, in this example by switch 1001 on the source side of transistor 103*b*. In use, with switch 1001 open, the first transistor 103*a* provides all the output current and will output a certain current for the given drive voltage V1. If switch 1001 is closed, second transistor 103*b* will also contribute to the output current. The size of transistors 103*a* and 103*b* may be designed to give a desired change in output current. For instance, if the first transistor 103*a* has a width W and the second transistor 103*b* has a width equal to 99*W, then the output current will increase by a factor of 100, for the given drive voltage V1, when the second transistor 103*b* is enabled.

The first and second transistors 103*a* and 103*b* may therefore be implemented with respective widths chosen with regard to expected changes in load current demand for a particular application, for instance the expected load current demand when a module of the load is disabled/inactive or enabled/active respectively. The controller 301 can control switch 1001 to enable the second transistor 103*b* in response to the load activity signal ACT indicating a significant increase in load current demand, e.g. indicating that a module of the load is enabled. Enabling the second transistor 103*b* will increase the overall output current for the current drive voltage V1. In a similar manner as discussed above, if the increased output current is correctly matched to the load current demand, the output voltage Vout will be maintained and there may be no substantial perturbation of the control loop of the LDO. To the extent that there is any mismatch between the output current and load current demand, the control loop will operate to maintain the output voltage Vout, and will reach the new correct operating point more quickly than otherwise would have been the case (without the change in width of the output device). If the load activity signal ACT indicates later that there will be a significant decrease in load current demand, e.g. a load module is disabled, the controller 301 may control the switch 901 to stop the second transistor 103*b* contributing to the output current, and thus provide a decrease in output current for the given drive voltage V1.

Figure 11:
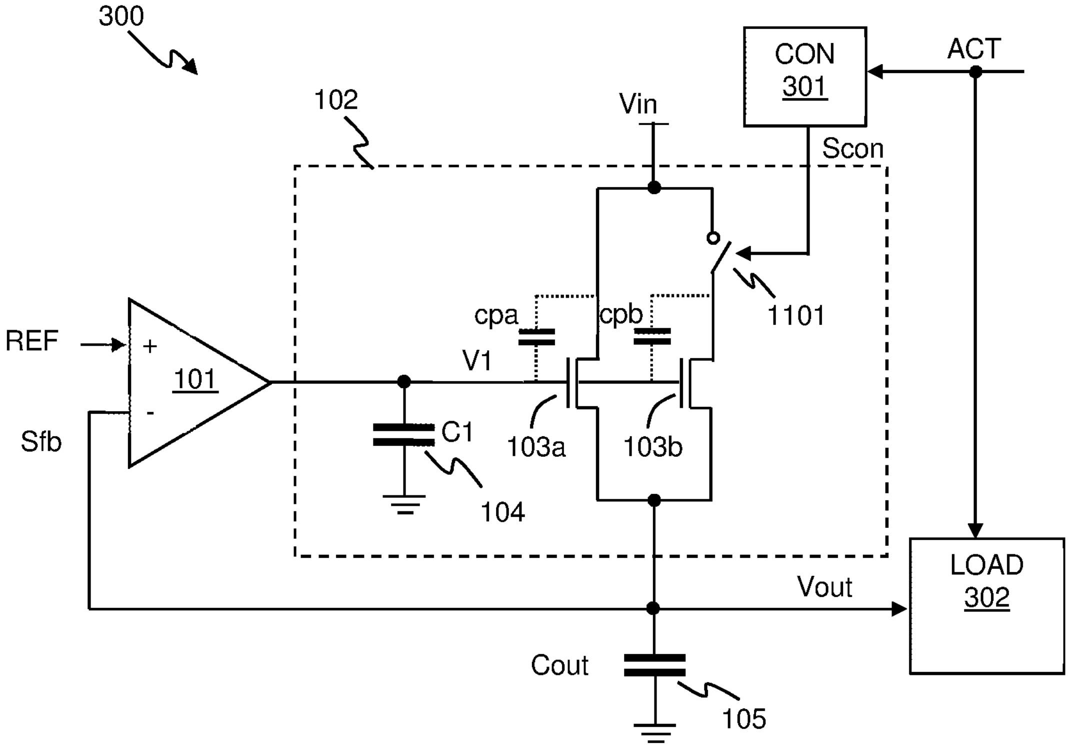
FIG. 11 illustrates another example in which the effective width of the output device can be controllably varied.

FIG. 11 illustrates another example in which the output stage is reconfigurable to provide a variable size of output device. The LDO of FIG. 11 again has first and second transistors 103*a* and 103*b* that receive the same drive voltage V1 and where the second transistor 103*b* may be selectively coupled to contribute to the output current. In the example of FIG. 11, however, the second transistor 103*b* is selected by switching on the drain side, e.g. by controlling switch 1101.

Closing switch 1101 varies the effective size of the output device, with the second transistor contributing to the output current, in a similar manner as discussed with respect to FIG. 10.

In addition, however, closing switch 1101 will add the gate-drain capacitance of the second transistor 103*b* to that of the first transistor 103*a*. As one skilled in the art will appreciate, there will be a parasitic gate-drain capacitance associated with each of the first and second transistors 103*a* and 103*b*, illustrated as capacitances cpa and cpb in FIG. 11. With switch 1101 open, the capacitance between the control node and the input voltage is due to the capacitance cpa of the first transistor alone. Closing switching 1001 adds the capacitance cpb, which increases the effective capacitance, and the resulting charge redistribution will tend to pull up the voltage on the loop capacitor 104, and hence also the drive voltage V1. Charging of the drain-gate capacitance cpb of second transistor 103*b* adds charge to the shared gate signal, boosting the drive voltage. Thus, selectively switching the output transistor 103*b* on the drain side can provide not only a change in effective size of output device, i.e. overall width of the output transistor(s), which provide a greater output current for a given drive voltage, but the switching can also provide a change in drive voltage V1.

It will be understood that FIGS. 10 and 11 show first and second transistors 103*a* and 103*b* as being selectable to vary the effective size of the output device between two values, but in some implementations the output device may comprise one or more additional selectable transistors, so as to provide more than two different selectable effective widths. It will also be understood that whilst discussed as separate transistors, in some implementations the first and second transistors could be implemented together as part of a segmented, variable width device.

It will also be understood that any of these techniques for controllably varying the output current may be implemented in combination. Thus, for example, a reconfiguration of the output device, to provide a variation in output current for a given drive voltage may be implemented together with a controlled change in the drive voltage, in order to provide a desired change in output current for a given change in load activity. For instance an LDO may have a variable size output device such as illustrated in FIG. 10 and also a controllable DAC for applying a controlled variation to the drive voltage such as illustrated in FIG. 6 or 7. The controller may be configured to controllably vary one or both of the size of the output device and the voltage output by the DAC to provide a desired change in output current. Compared to using a DAC alone to vary the drive voltage, also changing the size of the output device can reduce the required output range of the DAC to provide the required change in output current. Similarly, the use of the DAC to vary the drive voltage may reduce the need for the change in size of output device to provide all the change in output current. In some implementations, a change in device size may provide a relatively large change in output current, whereas the DAC may have a relatively fine output resolution so as to allow control over the change in output current to a relatively fine degree. The change in device size may thus allow for a coarse control over the output current, and the DAC may be controlled to provide fine control.

As noted above, the use of a DAC to provide a controllably variable voltage change in order to provide a change in output current, such as discussed with respect to the examples of FIGS. 6, 7 and 9 (whether or not implemented with a variable size of output device) can be advantageous in allowing for tuning or calibration to correctly match the change in output current to a given change in load activity and/or to account for the operating conditions such as temperature. Similarly, the variable duration (and/or defined current magnitude) of the example of FIG. 8 would also allow for tuning of the resultant voltage change, and hence change in output current.

The controller 301 may thus control the LDO based on one or more stored control settings for a given change in load activity, where the setting(s) have been previously determined. For instance, for the examples where the controller 301 controls a DAC such as discussed with reference to FIG. 6 or 7, the relevant DAC codes, i.e. control input for the DAC, may be determined as part of an initial learning process. The initial learning process may be implemented to learn the correct waveform for the output of the DAC as a function of the change in load activity.

In some instances, the DAC codes or settings for a given change in load activity may be determined by simulation or testing. For instance, for a given application, a series of simulated changes of load activity could be performed, varying operating conditions such as temperature and voltage, and simulating various process variations, with representative mismatch for DAC elements. By analysing the simulations, the optimum DAC code(s) that minimizes the overall variation in output voltage, e.g. output voltage ripple, across a range of devices may be determined. In use, when, the load activity signal indicates the relevant change in load activity, the controller may then control the DAC in accordance with the predetermined DAC codes.

In some examples, the relevant DAC codes may be determined as the optimal codes across a range of different expected operating conditions. In some examples however, as noted above, the controller may be arranged to take one or more operating conditions into account and thus may selectively vary the control settings, e.g. the DAC codes used for a given change in load activity based on an indication of operating conditions such as temperature or voltage.

Figure 12:
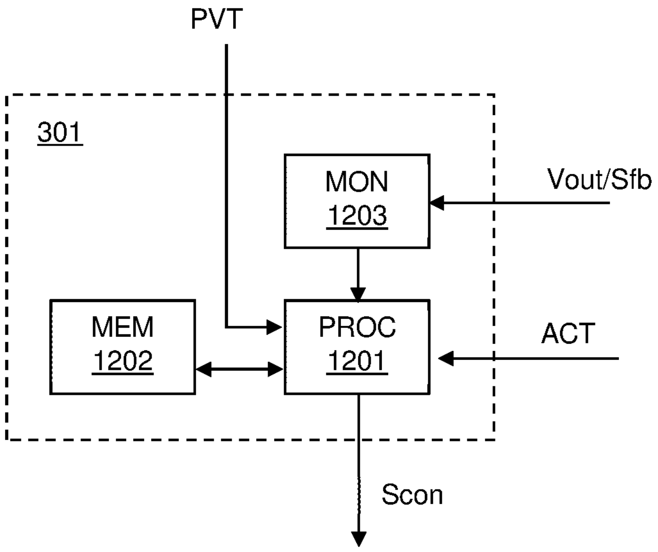
FIG. 12 illustrates one example of a suitable controller.

FIG. 12 illustrates one example of a controller 301 that is operable to take operating conditions into account. The controller 301 in this example includes a processing module 1201 which is configured to receive the load activity signal ACT. In some applications, the load activity signal ACT may simply be a two-level logic signal for enabling or disabling a component of the load which would result in a significant change in load current demand, in which case the controller 301 may respond to any change in the load activity signal.

In some embodiments however the load activity signal may be more complex and could, for instance, indicate the operating status of a plurality of different components of the load and/or indicate a plurality of different possible changes in load current demand. If necessary the processing module 1201 may apply some analysis to the load activity signal ACT so as to detect any change in load activity that will cause a significant change in load current and/or identify the type of change of load activity.

The processing module 1201 may also receive at least one indication of operating conditions, such as temperature and/or supply voltage, e.g. a signal PVT from a PVT module (not illustrated). In the event of any detected change in load activity, the processing module may retrieve some stored control settings, e.g. DAC codes, from memory 1202 which may be implemented as a look-up table or the like and generate an appropriate control signal Scon. Additionally or alternatively, the controller 301 could comprise some circuitry (not illustrated) for providing an indication of variations in operating conditions, such as temperature or supply voltage. For example, a ring-oscillator could be provided where the drive-strength of the ring elements, e.g. inverters, is based on the supply voltage. The frequency of oscillation will depend on the supply voltage, as well as process factors and conditions such as temperature and thus the frequency of the oscillator could be monitored, e.g. using a counter, to provide an indication of operating conditions.

Additionally or alternatively, in some implementation the controller 301 may be implemented to be capable of self-calibration. In some examples the controller may thus be operable to apply learning techniques, e.g. machine learning, to control operation of the LDO, in particular to determine the correct variation in control settings for a given change in load activity to minimize unwanted variation of the output voltage.

FIG. 12 thus illustrates that controller 301 includes a monitor 1203 for monitoring the output voltage following a change in load activity. The monitor 1203 may thus be configured to receive a version of the output voltage or the feedback signal Sfb or some other signal indication of the output voltage. The monitor may be configured to monitor the extent of any unwanted variation in output voltage following a change in load activity. The monitor 1203 may, for instance, determine the magnitude of any voltage ripple following a change in load activity.

The processing module 1201 may receive an indication of the extent of any unwanted variation in output voltage, e.g. ripple, from the monitor 1203 and apply a learning or optimization process to optimize the control settings, e.g. DAC codes used, to minimize the unwanted variation in output voltage.

For example, the DAC code(s) for a given event, i.e. a given change in load activity, can be optimized by noting the extent of any ripple and adjusting the DAC code when the next event of the same type occurs. A simple scheme, which may be seen as a type of hill-climbing algorithm, may take the DAC code used previously and alter the DAC code so as to increase or decrease the output voltage by a small amount, e.g. by changing the DAC code by one least-significant bit (LSB). The resulting ripple from using the altered code is compared to the previous ripple. If the ripple is improved the code can be progressively altered in same manner, i.e. by increasing or decreasing again, until no further improvement is gained. It will be understood however that more complex algorithms are possible and/or a variety of machine learning methods may be used to learn the optimum control settings as a function of the change in load activity, and the use of learning algorithms or machine learning for optimizing control of an LDO represents a novel aspect of the present disclosure.

It will be appreciated that any period of overvoltage, i.e. where the magnitude of the LDO output voltage is above the nominal magnitude of the regulated voltage, may be undesirable in terms of power efficiency. However any period of undervoltage, where the magnitude of the LDO output voltage is below the nominal magnitude of the regulated voltage may be undesirable in that it may impact on the correct operation of the load, and in some cases could result in reset of at least some part of the load or the wider system. The optimum control settings may, in some instances, be ones that minimise the extent of overvoltage, but without a risk of a undervoltage.

Embodiments of the present disclosure thus relate to a voltage regulator, in particular an LDO, that monitors load activity so as to determine when a significant change in load current demand will occur and responds to a detection of such an expected change in load current demand independently of the normal control loop. The LDO may thus have a controller that operates independently of the control loop to provide a change in an output current that meets at least some of the new load current demand.

It will be noted that the controller operates independently of the control loop in that the response of the controller is not determined by, or as part of, the control loop. Instead the controller responds to a separate load activity signal. For the avoidance of doubt, it will be clear that the control loop will continue to function, and the controller may, in some embodiments, effect the change in output current by modulating the drive voltage within the control loop. It will also be clear that the control loop will itself also respond to any variation in the output voltage caused by a changed load current demand.

By monitoring the load activity to detect or anticipate a variation in load current demand and controlling the LDO to provide a change in output current that substantially matches the new current demand, the amount of unwanted voltage variation at the output can be significantly reduced. Thus, can reduce the need for a large value of output capacitor, allowing the output capacitor to be readily integrated in same die with the LDO without undue size.

Embodiments may also be advantageously used to provide a voltage regulator, in particular an LDO, in which the value of the regulated output voltage may be controllably varied in use. In some applications it may be advantageous for an LDO to be able to output a variable voltage, e.g. to be operable to selectively regulate the output voltage to one of a plurality of different possible voltage magnitudes. For instance, one possible application is for allowing Dynamic Voltage Scaling (DVS) for a load comprising a digital processing circuitry, e.g. a computing element. In a DVS mode of operation, the voltage supply to a computing element is adjusted in response to how much computing needs to be performed—the higher the voltage, the faster the operation and the more computing may be performed.

The regulated output voltage of an LDO may be controlled by controlling the reference voltage REF. If the magnitude of the reference voltage REF is changed, the control loop of the LDO will operate to reduce the difference between the feedback signal Sfb and the new reference voltage, and thus will drive the output voltage to a new level related to the new reference voltage.

Conventionally this will require the control loop to increase or decrease the output current until the output capacitor 105 has been charged or discharged to the new regulated output voltage level. If the value of the output capacitor 105 is large, e.g. as may be the case for a conventional LDO to mitigate against the effect of changes in load current demand, it may take some time to change the output voltage to the new regulated level. Embodiments of the present disclosure can allow for a smaller output capacitor to be used than otherwise might be the case, which means that the output voltage may be changed to a new regulated output level more quickly.

In some embodiments the controller 301 may additionally be operable so as to provide a change in output current to aid in a change of regulated output voltage. Thus, if the regulated output voltage is increased, by increasing the magnitude of the reference voltage REF, the controller may be configured to control the output stage of the LDO to provide an increased output current so as to charge the output capacitor to the new output value more quickly. Likewise, if the regulated output voltage is decreased the controller may be configured to control the output stage of the LDO to provide an increased output current so as to discharge the output capacitor to the new output value more quickly.

In some instances, the change in value of the regulated output voltage of the LDO may be implemented because of a change in load activity, and thus may occur at, or about, the same time as an expected current change in load current demand. In such a case, the controller may control the output stage of the LDO to provide a change in output current that at least partly meets the new current demand as discussed above. This may reduce the time taken to charge or discharge the output capacitor 105 to reach the new regulated voltage level. In some instances, however, the controller 301 may operate to control the output current to vary over time.

For instance, consider that the LDO is initially operating in relatively steady state, with the reference voltage REF at a first reference magnitude so as to regulate the output voltage to a first output magnitude and that initially the load current demand is at a level I1. The operating mode of the load then changes, which requires the output voltage to have a second, higher output magnitude and wherein the load current demand will be a higher level I2. In response to the change in mode, the value of the reference voltage may be changed to a second, higher, reference magnitude that corresponds to the required second output voltage magnitude. In some instances, the controller 301 may be configured to control the relevant reference voltage magnitude in response to the load activity signal, as illustrated in FIG. 3.

The controller 301 also controls the output stage to provide an increased output current and controls the output stage to vary the output current over time. The controller may thus, during a transition period, control the output stage to provide a first increased output current in order to meet the new load demand and also charge the output capacitor, for instance for the embodiment of FIG. 6 or 7 the controller may control the DAC to increase the DAC output voltage to a first increased level during the transition period.

The output current during this transition period may be greater than the load current demand I2 so as to aid in charging the output capacitor 105. After the transition period, the controller 301 then controls the output stage of the LDO to reduce the output current, but to a level which is still increased above the original output current before the change in load activity. Ideally the output current would be set to a level at or about the load current demand I2 so that the output current of the LDO meets the new load current demand. The operation of the controller thus provides at least some of the required change in output voltage and load current and can significantly reduce the time taken for the LDO to operate at the new voltage level compared to the response of the control loop alone.

For a reduction in output voltage and load current demand, the controller could operate in a similar fashion, to reduce the output current to a low level for a period to aid in discharging of the output capacitor before controlling the LDO to provide an output current matched to the new current demand.

The various control setting applied during and after the transition period and/or the duration of the transition period may be predetermined and stored in a suitable memory and/or may be tuned or calibrated by a learning process or with machine learning in a similar manner as discussed above.

Embodiments may be implemented as an integrated circuit. Embodiments may be implemented in a host device, especially a portable and/or battery powered host device such as a mobile computing device for example a laptop, notebook or tablet computer, a games console, a remote control device, a home automation controller or a domestic appliance including a domestic temperature or lighting control system, a toy, a machine such as a robot, an audio player, a video player, or a mobile telephone for example a smartphone. The device could be a wearable device such as a smartwatch. It will be understood that embodiments may be implemented as part of a system provided in a home appliance or in a vehicle or interactive display. The voltage regulator may be as part of a power supply, which may be a power supply for at least one processing or computing element that may be enabled and disabled as required, but it will be understood that the voltage regulator may be used to supply other circuitry. There is further provided a host device incorporating the above-described embodiments.

The skilled person will recognise that some aspects of the above-described apparatus and methods, for example the learning methods may be embodied as processor control code, for example on a non-volatile carrier medium such as a disk, CD- or DVD-ROM, programmed memory such as read only memory (Firmware), or on a data carrier such as an optical or electrical signal carrier. For many applications, embodiments will be implemented on a DSP (Digital Signal Processor), ASIC (Application Specific Integrated Circuit) or FPGA (Field Programmable Gate Array). Thus, the code may comprise conventional program code or microcode or, for example code for setting up or controlling an ASIC or FPGA. The code may also comprise code for dynamically configuring re-configurable apparatus such as re-programmable logic gate arrays. Similarly, the code may comprise code for a hardware description language such as Verilog™ or VHDL (Very high-speed integrated circuit Hardware Description Language). As the skilled person will appreciate, the code may be distributed between a plurality of coupled components in communication with one another. Where appropriate, the embodiments may also be implemented using code running on a field-(re)programmable analogue array or similar device in order to configure analogue hardware.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference numerals or labels in the claims shall not be construed so as to limit their scope.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

The invention claimed is:

1. A voltage regulator comprising:

an output stage comprising an input node for receiving an input voltage; an output node for outputting an output voltage; and an output device comprising at least one transistor configured to pass an output current to the output node based on a drive voltage at a control node;

a differential amplifier configured in a control loop for the output stage to receive a feedback signal derived from the output voltage at a first input and to receive a reference voltage at a second input and to generate an amplifier output to control the drive voltage of the output stage to minimise any difference between the feedback signal and the reference voltage; and a controller operable to selectively reconfigure the output stage to provide a change in output current in response to a load activity signal indicative of a change in load activity that results in a change in load current demand for a load connected, in use, to the output node, wherein said reconfiguration of the output stage results in a change of current which is independent of the operation of the control loop such that a given value of amplifier output will lead to a different value of output current before and after the reconfiguration of the output stage.

2. The voltage regulator of claim 1 wherein the controller is operable to reconfigure the output stage to provide a variation in the drive voltage so as to provide at least some of said change in output current.

3. The voltage regulator of claim 2 wherein said variation in the drive voltage is a step-change in the drive voltage.

4. The voltage regulator of claim 2 comprising a digital-to-analogue converter (DAC) coupled to the control node such that a variation in the DAC output results in a variation in the drive voltage and wherein the controller is configured to control the output of the DAC.

5. The voltage regulator of claim 4 wherein the output stage comprises a loop capacitor with a first terminal coupled to the control node and the DAC is coupled to a second terminal of the loop capacitor.

6. The voltage regulator of claim 4 wherein the DAC comprises a plurality of DAC capacitors each having a first terminal coupled to the control node and wherein a second terminal of each of the DAC capacitors is selectively connectable to one of at least two defined voltages.

7. The voltage regulator of claim 2 wherein the output stage comprises a loop capacitor with a first terminal coupled to an output of the differential amplifier and a voltage bias source and the voltage regulator is configured such that the first terminal of the loop capacitor can be selectively connected to the control node via a first path that bypasses the voltage bias source or a second path which includes the voltage bias source in series, and wherein the controller is configured to control connection via the first path or the second path.

8. The voltage regulator of claim 1 wherein the output stage comprises a loop capacitor with a first terminal coupled to the control node and one or more current sources for sourcing or sinking current from the control node, wherein the controller is configured to control the one or more current sources to selectively charge or discharge the loop capacitor to provide a variation in the drive voltage independently of the control loop.

9. The voltage regulator of claim 2 wherein the controller is operable to selectivity control the variation in the drive voltage applied in response to a change in load activity based on at least one of temperature and input voltage.

10. The voltage regulator of claim 2 wherein the controller is operable to control the variation in the drive voltage for a type of change in load activity based on one or more stored control settings predetermined for that type of change in load activity.

11. The voltage regulator of claim 10 wherein the controller further comprises a monitor for monitoring the output voltage in response to a change in load activity to determine an extent of any variation in output voltage and wherein the controller is configured to, over the course of a plurality of changes in load activity, adapt the one or more stored control settings so as to minimise the extent of any variation in output voltage.

12. The voltage regulator of claim 1 wherein the controller is operable to reconfigure an effective size of the output device so as to provide at least some of said change in output current.

13. The voltage regulator of claim 12 wherein the output device comprises a first transistor and at least one additional transistor which can be selectively coupled in parallel with the first transistor to vary the size of the output device.

14. The voltage regulator of claim 13 wherein a gate terminal of the additional transistor is coupled to a gate terminal of the first transistor, a source terminal of the additional transistor is coupled to both a source terminal of the first transistor and the output node and wherein a drain terminal of the additional transistor is configured to be selectively coupled to both a drain terminal of the first transistor and the input node.

15. The voltage regulator of claim 1 wherein the controller is operable to reconfigure the output stage to provide a variation in a bulk bias voltage applied to a bulk terminal of the at least one transistor of the output device so as to provide at least some of said change in output current.

16. The voltage regulator of claim 1 wherein the voltage regulator is operable to selectively regulate the output voltage to one of a plurality of different voltage magnitudes, and wherein the controller is configured, in response to a change in output voltage magnitude to control the output stage to provide a change in output current from the output device for a transition period so as to charge or discharge an output capacitor coupled to the output node.

17. The voltage regulator of claim 6 wherein the voltage regulator is configured to selectively vary the output voltage magnitude to provide dynamic voltage scaling for the load connected, in use, to the output node.

18. The voltage regulator of claim 1 comprising an output capacitor coupled to the output node, wherein the output capacitor is integrated with the voltage regulator in a semiconductor die.

19. A voltage regulator for outputting a regulated output voltage comprising:

an amplifier configured to receive a feedback signal indicative of the output voltage and reference voltage and to generate an amplifier output to control an output stage as part of a control loop to maintain the regulated output voltage; and a controller operable independently of the control loop to selectively control the output stage to provide a variation in output current without any change in amplifier output in response to a load activity signal that indicates a change in load current demand.

* * * * *